Dec. 1, 1959     O. MOSER     2,915,586
TELETYPEWRITER

Filed Feb. 25, 1954     8 Sheets-Sheet 1

O. MOSER 2,915,586

TELETYPEWRITER

Filed Feb. 25, 1954

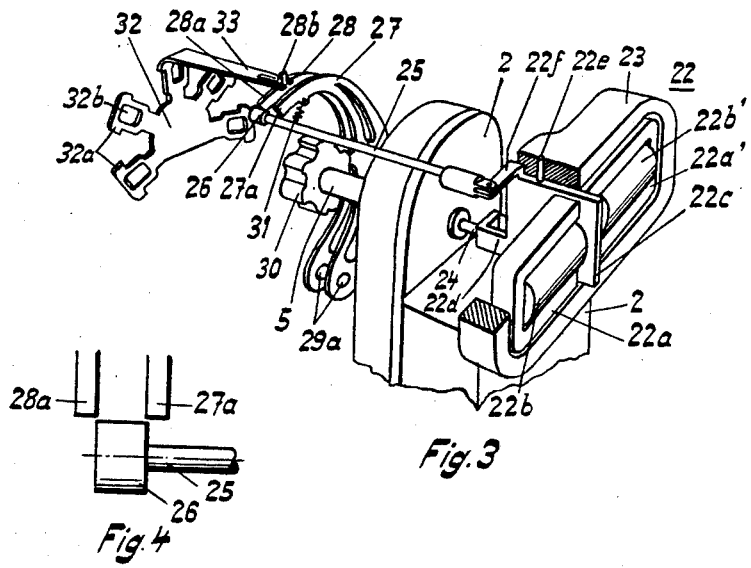
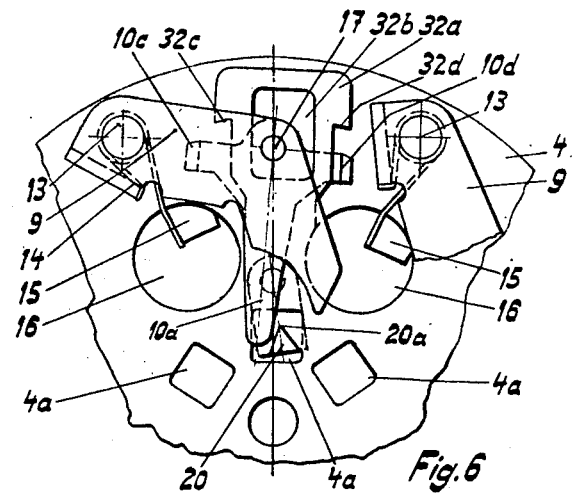
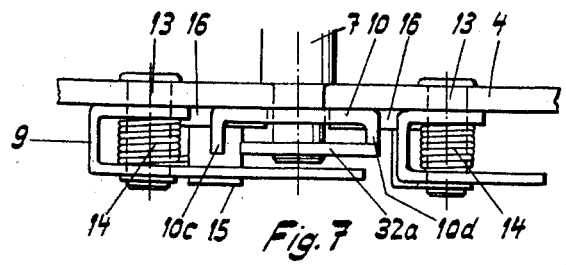

Dec. 1, 1959   O. MOSER   2,915,586
TELETYPEWRITER
Filed Feb. 25, 1954   8 Sheets-Sheet 5

Dec. 1, 1959　　　O. MOSER　　　2,915,586
TELETYPEWRITER
Filed Feb. 25, 1954　　　8 Sheets-Sheet 6

Dec. 1, 1959     O. MOSER     2,915,586

TELETYPEWRITER

Filed Feb. 25, 1954     8 Sheets-Sheet 7

United States Patent Office 2,915,586
Patented Dec. 1, 1959

2,915,586
TELETYPEWRITER

Otto Moser, Bern, Switzerland

Application February 25, 1954, Serial No. 412,513

Claims priority, application Switzerland February 28, 1953

8 Claims. (Cl. 178—28)

My invention relates to teletypewriters and other teleprinting apparatus of the type in which the code-signal receiver and the printing mechanism are mounted together on a carriage movable alongside a platen roller, and in which the type carrier of the printing mechanism has several rows of type faces and performs a revolving movement as well as a lifting movement for selecting the one type to be printed at a time, the carrier axis being movable in a plane perpendicular to the axis of the platen roller and the printing being effected by swinging the type carrier against the platen roller.

Relating to teleprinters of this general type, it is among the objects of my invention to improve the printing mechanism of such machines, particularly the drive means for selectively revolving and lifting the type carrier, toward a more compact design and toward a better uniformity of the imprints than heretofore afforded by teleprinters of this type.

Various means for driving the type carrier in such machines have become known. For instance, one of the known teleprinters has a type carrier with three rows of type faces that is mounted on a movable slider guided on three shafts of square cross section. By revolving the individual shafts, the type carrier is lifted or lowered for selecting one of its three type rows, and is revolved for selecting one type face in that row, and is moved against the platen roller for producing an imprint. The lifting and revolving movements may occur simultaneously as the respective two squared shafts are driven by mutually independent electromagnetic drive means. The return motion of the type carrier into the initial position of rest is effected by means of springs.

Another known design of a teleprinter has a type carrier with a fixed axis of revolution. The selective setting to the printing position of a type face in a type row is effected by a stop that revolves together with the type carrier and passes by a number of circularly arranged selector levers of the receiver whereby the type carrier is arrested when the stop abuts against the one selector lever that previously has been selectively placed into the path of the stop.

In another known teleprinter, the printing device is adjusted by means of a control device that operates in dependence upon the code elements of the pulse combination being received and adjusts the type carrier directly and progressively in such a manner that the type face corresponding to the pulse combination is placed into printing position after the last code element is received, whereupon the carrier is swung against a platen roller. This control device comprises several rows of rotatable stops, the rows being assigned to the respective code elements. The number of stops in each subsequent row is twice the number of stops in the preceding row. Correlated to each row of stops is a stationary abutment selectively actuable by respective elements of the pulse combination. The control device therefore is essentially a modification of the generally customary selector-bar or selector-disc devices for the storing or memorizing of signals. For shifting between the type rows in this machine, the platen roller rather than the type carrier is lifted to a corresponding position, the swinging movement of the type carrier being limited to the stroke needed for the printing operation proper.

A modified design of the teleprinter last described is equipped with a multiple-row type carrier on which the type faces denoting letters on the one hand and the type faces denoting numerals and other characters on the other hand, are arranged in two respective pairs of rows. The characters in the two rows of a pair respond to the different selector pulses that may form the first element of a multiplex code signal. In other words, the first element of a pulse combination being received serves to select one of the rows of type faces depending upon whether this code element is a "pulse" or a "pulse." The displacement of the type carrier for shifting between the type rows is effected by means of two series-connected knee-action mechanisms of which one is operated by the character-shifting signal pulses and results in a displacement of the type carrier by two type rows, while the other knee-action mechanism is controlled in dependence upon whether the first code element is a "pulse" or a "pause" and results in a displacement of the type carrier by one type row. When both knee-action mechanisms are actuated the displacements caused thereby act additively.

All of these known teleprinters have in common that the movements necessary for the selection of the one character to be imprinted are imparted to the type character by a direct driving action. In contrast thereto, it is a feature of my invention that these selecting movements of the type carrier are produced by an indirectly operating drive, and I have discovered that this results in a generally much more favorable design affording numerous improvements as regards construction and manufacture, including a reduction in the number of individual parts and a reduction in overall size and weight of the printing mechanism.

According to another feature of my invention and in further distinction from the above-mentioned known teletypewriters, a machine according to the invention is equipped with a printer drive mechanism that causes the swinging motion of the type carrier to occur in three distinct components or stages in such a manner that during the first stage of motion the type carrier is swung out of its initial position through a relatively large angle up to a few angular degrees spacing from the platen roller, while during the second stage of motion the type carrier is flung against the platen roller and in the third stage of motion is swung back to the initial position.

According to another feature of my invention, the rotary movement as well as the axial displacement or lifting movement of the type carrier for setting the character to be printed into the proper position occur during the first stage of motion and are effected by means of stops that move together with the type carrier and coact with parts of the previously adjusted selecting or code-pulse translating device of the code-pulse receiver.

The foregoing and other objects, features and advantages of the invention will be apparent from, and will be referred to, in the following description of an embodiment of the invention exemplified on the drawings.

The illustrated embodiment consists in the receiving and printing assembly of a teletypewriter of the start-stop system to operate in response to a five-unit multiplex code of signals.

Fig. 3 is a perspective view of the signal-responsive electromagnet of the apparatus in conjunction with some of the receiver parts that coact with the receiver magnet.

Fig. 4 shows some of these receiver parts separately.

Fig. 6 shows on a larger scale and more in detail a portion of the mechanism illustrated in Fig. 5.

Fig. 7 is a top view of the mechanism portion shown in Fig. 6.

Figure 18:
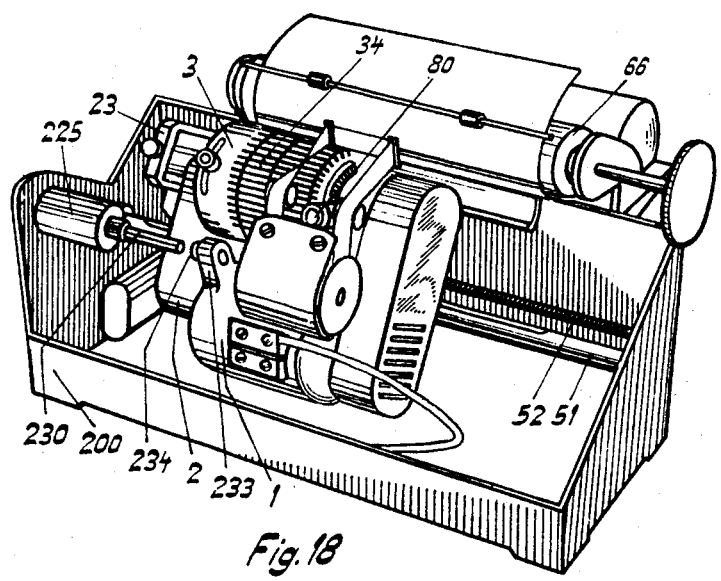
Fig. 18 is a perspective view of the entire apparatus.
Figure 12:
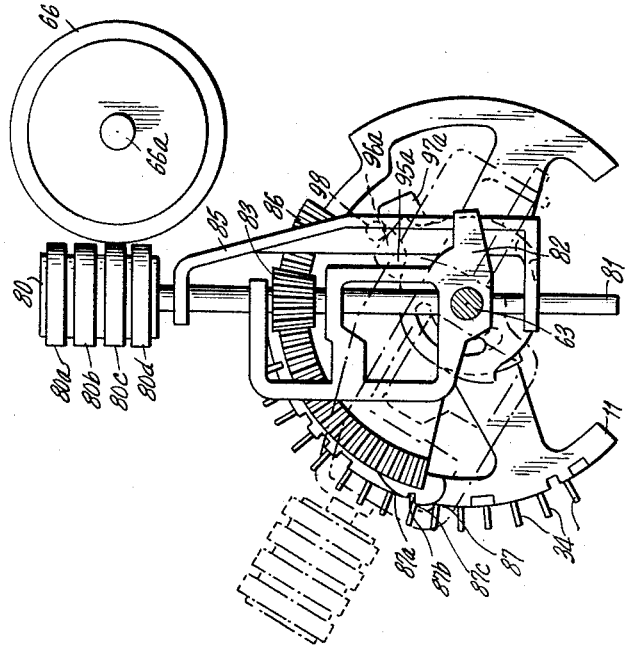
Fig. 12 is a detail view of some of the parts shown in Fig. 11.

As customary, the illustrated machine has a stationary and rigid frame structure 200 (Figs. 1, 2, 18) on which all other parts are stationarily or movably mounted. The frame carries the revolvable platen roller 66 (Figs. 12, 18). Rigidly secured to the frame structure 200 are two cylindrical rods 51, 52 that extend in parallel relation to the shaft 66a of the platen roller 66 and serve as guide rails for a movable carriage assembly that comprises a signal receiving and translating portion as well as a printing portion.

Figure 1:
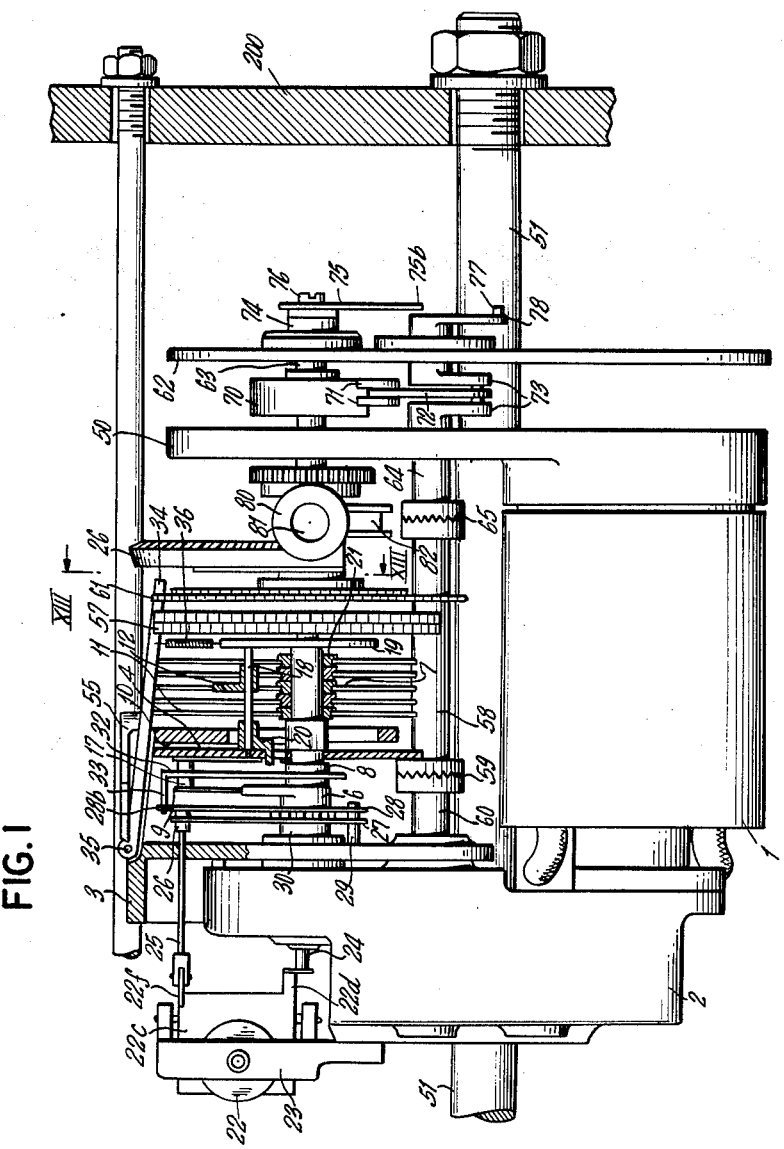
Fig. 1 shows a partly sectional front view of the apparatus.

The main supporting elements of the carriage assembly comprise a gear box 2 joined with a frame or housing structure 3, and a bearing plate 50. Gear box 2 and plate 50 are rigidly flanged to the housing of an electric drive motor 1 at opposite axial sides thereof (Figs. 1, 18). The carriage assembly as a unit is movable along the guide rods 51, 52 and hence along the platen roller 66. To permit such translatory movement, a supporting ring 53 (Fig. 1) is firmly secured to the gear box 2, and a similar ring is secured to the plate 50 in coaxial relation to ring 53, only one of the two supporting rings 53 being visible in Fig. 2. Each of the supporting rings carries three ball bearings 54 that are 120° displaced from each other and roll along the rod 51. Two further ball bearings 55 (Figs. 1, 2) are mounted on a bracket 56 that forms part of the housing 3. The two ball bearings 55 lie opposite each other and are in rolling engagement with guide rod 52. As mentioned, the carraige assembly comprises a signal receiving and translating portion (receiver), and a printing portion (printer). These two portions are described in the following.

*The receiver*

The illustrated receiving portion of the apparatus is of the type in which the received pulse combinations are translated and stored by means of a cam operated translating mechanism whose cam shaft is driven in start-stop motion and imparts selective adjusting movements under control by a pulse-receiving electromagnet to a group of displaceable selector structures.

A cam shaft 5 (Figs. 3, 8) is journalled in gear box 2 and extends to the outside where it carries a cam 6 with a single cam lobe 6a (Figs. 1, 8) and also a five-lobe cam 30 (Figs. 1, 3). In gear box 2, the cam shaft 5 is connected with the shaft of motor 1 by a gear transmission and a slip clutch described in a later place. Motor 1 runs continuously as long as the teletypewriter is in operative condition, but cam shaft 5 is normally at rest and is coupled with the motor for a single complete shaft revolution when a release pin 24 (Figs. 1, 3, 8) of the slip clutch is moved away from the gear box 2 by operation of the receiver magnet described below. Hence, the start signal of each pulse combination being received causes the shaft 5 with cams 6 and 30 to commence a start-stop cycle of motion. During the period of this cycle the receiver magnet responds to the arriving five-unit code pulses proper; and it is the function of the receiving apparatus to translate the code-pulse combination into a corresponding, discriminating adjustment of mechanical structure that, in turn, controls the selective operation of the printing mechanism. The translating mechanism of the receiver is supported by a frame plate 4 (Figs. 1, 5, 7) that is rigidly mounted within housing 3. A stationary spindle 7 is firmly secured to plate 4 by means of a bearing screw 8 and extends in coaxial relation to cam shaft 5.

The translating mechanism comprises several individually operating devices whose number corresponds to that of the code elements of the signals to be received. Hence, since the illustrated teletypewriter operates in accordance with a start-stop system using a five-unit code, the translating mechanism in the illustrated machine has five individual translating devices.

Each of these devices comprises a control lever 9 (Figs. 1, 5, 6, 7) operable by the cam 6, a feeler member or "sword" 10 pivotally mounted on lever 9, and a reversing lever 12 acting upon one of five respective selector discs 11 (Figs. 1, 8, 11, 12). Only one of the five units of the translating mechanism is fully shown in Figs. 1, 6 and 8, but all of them are partially visible in Fig. 5. The individual translating units are grouped around the axis of shaft 5 and their respective control levers 9 extend all toward the shaft and into the operating range of the cam lobe 6a so that the five control levers 9 are sequentially engaged and actuated by cam 6 during each start-stop revolution of shaft 5.

Figure 5:
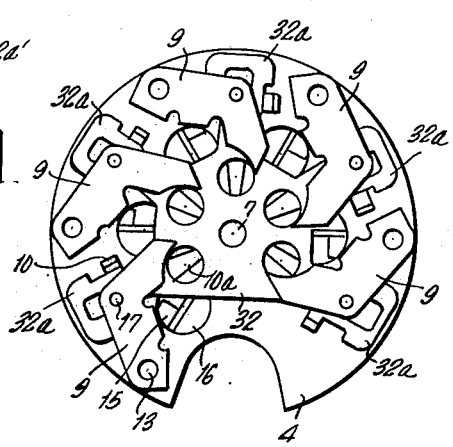
Fig. 5 is an axial view onto the code translating mechanism of the apparatus, the view being from the left of Fig. 1.

Each control lever 9 is rotatably mounted on a pivot pin 13 (Figs. 5, 6) secured to plate 4 and is normally biased by a spring 14 to a position of rest in which the lever 9 abuts against a stop pin 15 (Fig. 5). The five stop pins 15 are mounted on plate 4 together with respective stops 16 for the five feeler members 10.

Each feeler member 10 is rotatable on a pivot pin 17 mounted on the pertaining control lever 9 (Figs. 1, 5, 6) and has its tip directed toward the center of the device. The reversing levers 12 sit on respective pins 18 (Figs. 1, 6) which have one end revolvably journalled in a plate 4 while the other end is revolvably journalled in a stationary plate 19 secured to spindle 7. Each revolvable pin 18 carries a swing arm 20 (Figs. 1, 6) of angular shape. The arms 20 extend through respective openings 4a (Fig. 6) in plate 4. Each arm has a knife-edge extremity directed toward the tip 10a of one of the respective feeler members 10. The five selector discs 11 (Figs. 1, 8, 9) are mounted on respective hub rings 21 rotatably seated beside each other on spindle 7.

The receiver-magnet assembly 22 has a frame structure 23 of non-magnetic material firmly attached to gear box 2 (Figs. 1, 2, 3, 18). Two three-legged cores 22a and 22a' of magnetizable material are rigidly secured to frame structure 23 so that their respective pole faces lie opposite each other to form an intermediate air gap. The center leg of each core carries an excitation coil 22b or 22b'. The armature 22c of the magnet is pivotally mounted on frame 23 by means of two aligned pivot pins of which the upper pin 22e is visible in Fig. 3. The armature is reciprocable about its pivot axis in the air gap between the two magnet cores 22a and 22a' under control by excitation alternately applied to coils 22b and 22b'. This alternating excitation is controlled by the code pulses as will be explained below with reference to Fig. 10. The armature 22c has a lug 22d engageable with the clutch release pin 24 (Figs. 1, 3) so that the first movement of armature 22c from the magnet core 22a toward the magnet core 22a' moves the pin 24 away from the gear box 2 to release one start-stop cycle of the translating mechanism. Another lug 22f of armature 22c is linked to an axially displaceable rod 25 (Figs. 1, 2) slidably guided on frame plate 3.

The free end of rod 25 carries a piston-shaped stop 26. Stop 26 controls two feeler levers 27 and 28 in dependence upon which of the two end positions is occupied at a time by the reciprocable armature 22c. The feeler levers 27 and 28 are rotatably mounted on a common pivot pin 29 rigidly secured to the frame plate 3 (Fig. 1), the respective pivot holes of the feelers 27, 28 being denoted by 29a in Fig. 3. The rotational movements of the feeler levers 27 and 28 about pivot pin 29 are controlled by the above-mentioned five-lobe cam 30 on cam shaft 5. The lobes of cam 30 cooperate with the correspondingly shaped feeler levers 27, 28 in such a manner that the feeler levers, when engaged by one of the rotating cam lobes, are placed into the position relative to the axis of stop 26 shown in Fig. 4. In this position, the stop 26 is free to move back and forth in the axial direction of rod 25 under control by the armature movements of the receiving magnet. When the individual lobes of cam 30 pass out of engagement with the feeler levers 27, 28, these levers, biased by respective springs 31, move their free ends 27a and 28a toward the stop 26. The spacing between the feeler levers 27 and 28 relative to the axial length of stop 26 is such that one of the respective lever ends can pass laterally along the piston-shaped stop depending upon the position then occupied by the armature 22c, while the other feeler lever abuts against the cylinder surface of stop 26 and hence can not appreciably move about its pivot. In the position of stop 26 illustrated in Fig. 4, the armature 22c of the receiving magnet is in an intermediate position. During the translating operation proper, however, the stop 26 is positioned either toward the left or toward the right of the intermediate position shown in Fig. 4. The one feeler lever 27 or 28 which passes beside stop 26 then prevents the stop and thereby the rod 25 and the armature 22c to move back to the previous position. Thus the feeler lever latches the armature 22c in the position once occupied until the next lobe of cam 30 returns the feeler lever to the position illustrated in Fig. 3.

The feeler lever 28 transmits its pivotal movements to a disc or star-shaped control member 32 (Figs. 1, 3). Member 32 has a bifurcated arm 33 which straddles a lug 28b (Figs. 1, 3) of lever 28 for imparting a rotational movement to control member 32 in accordance with the pivotal movements of feeler lever 28. Control member 32 is rotatably mounted on the bearing screw 8 (Fig. 1) and has five radial arms 32a (Figs. 3, 6, 7). Each arm 32a has two projections 32c and 32d (Fig. 6) that cooperate with respective rectangularly bent lugs 10c and 10d of one of the respective feeler members 10 (Figs. 5, 6). Each arm 32a has an opening 32b (Figs. 3, 5, 6). The openings 32b are sufficiently large to permit a free movement of the pivot pins 17 (Figs. 1, 5, 6) that link the respective feeler members 10 to the control levers 9 and extend through the openings 32b.

A number of selector levers 34 (Figs. 1, 9, 12), corresponding to the number of the type characters to be selected in response to the received pulse combinations, are pivotally journalled on the frame plate 3. Only one of the selector levers 34 is visible in Fig. 1 where it is shown pivoted to frame plate 3 by means of a pivot pin 35. The frame plate 3 is substantially circular, and all selector levers 34 and pins 35 are arranged along the periphery. The selector discs 11 have a number of notches 11a (Fig. 12) along their respective peripheries. The distribution of these notches, in accordance with the known selector mechanisms for such purposes, is such that only one notch in each disc 11 is aligned with notches in the respective four other discs in any of the available combinations of relative disc positions. Consequently, only one of the selector levers 34 at a time can drop into an aligned row of notches under the biasing effect of a spring 36, as is shown in Fig. 1. The one selectively actuated selector lever is then in position to control the printer, thus translating the pulse combination stored by means of the group of selector discs 11 into a corresponding imprint.

Figure 10:
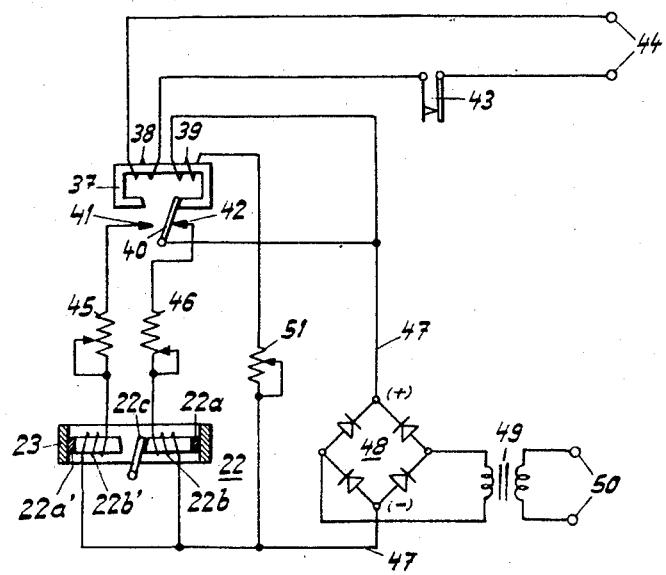
Fig. 10 is a schematic diagram of the electric receiving circuit for the pulse responsive control of the receiver magnet shown in Figs. 1, 2 and 3.

As illustrated in Fig. 10, the receiver magnet 22 has its two opposingly acting magnet coils 22b and 22b' connected in an excitation circuit which is energized from a local power source at the receiving substation and is controlled by a relay 37 in response to pulse signals from the communication line. Relay 37 is polarized and has two relay windings 38 and 39 for controlling a movable contact 40 to cooperate with two stationary contacts 41 and 42. Winding 38 is connected in series with a normally closed transmitter contact 43 across the communication-line terminals 44 of the apparatus. Stationary contact 41 is connected with magnet coil 22b' in series with a calibrating resistor 45. Contact 42 is connected with magnet winding 22b in series with another calibrating resistor 46. The movable contact 40 and the two other ends of windings 22b and 22b' are connected in a local excitation circuit 47 energized from across the output terminals of a rectifier 48. Rectifier 48 is connected through a transformer 49 to a suitable current supply 50, for instance an alternating current line. The winding 39 of relay 37 is also connected across the output terminals of rectifier 48 in series with a calibrating resistor 51. The local power supply for energizing the receiver magnet 22 may be identical with the one needed for energizing the above-mentioned drive motor 1 or any other electrically operated parts of the teleprint receiver; and the rectifier 48, if desired, may consist of a power rectifier used for also operating the motor and other components.

The constant excitation of relay winding 39 is adjusted by means of resistor 51 so that the movable contact 40 of relay 37 is in the illustrated position when the winding 38 receives current from line terminals 44. This condition prevails when the receiving apparatus is in the operative condition while no communication pulses are being received. Consequently, the control circuit of magnet assembly 22 is normally as shown in Fig. 10 so that coil 22b is excited and the armature 22c is attracted toward the magnet core 22a. The starting signal for a pulse combination consists in a temporary interruption of the communication-line current. Consequently, winding 38 becomes deenergized. As a result, the movable contact 40 opens at 42 the local excitation circuit for magnet coil 22b and instead closes at 41 the local excitation circuit for magnet coil 22b'. This causes the armature 22c to move toward the magnet core 22a'. As explained, the lug 22d then releases the slip clutch and couples the cam shaft 5 with the continuously running drive motor 1 to perform one start-stop cycle of cam revolution.

During the arrival of the immediately following combination of pulses and the subsequent release of the printing operation, the cam shaft 5 passes through one full revolution, three quarters of which are needed for storing the five signal pulses of the pulse combination in the assembly of selector discs 11. During the revolution of cam 6, the five control levers 9 are sequentially moved away from the axis. At the same time, the receiving magnet is controlled by the pulse combination so that the armature 22c, depending upon whether the code element consists of a current pulse or a current pause, occupies one or the other of its two end positions. These positions are felt off by the feeler levers 27 and 28 cooperating with the piston 26 under control by the five-lobe cam 30. These feeler operations may follow each other in time intervals of 20 milliseconds, corresponding to a suitable unit length of the code combinations. The feeler lever 28 transfers its movement onto the control member 32 (Fig. 3) which accordingly is placed into one of its two angular positions.

Assume that the control member 32, after a reception of one individual code element, is in the position shown in Figs. 6 and 7. When the one control lever 9 sequentially correlated to that one code element is being actuated by the revolving cam 6 and turns outwardly about its pivot pin 13 (i.e. upwardly in Fig. 6), the pertaining feeler member 10 moves also outwardly (upwardly in Fig. 6). This moves the feeler lug 10d into abutment against the projection 32d of the adjacent arm 32a of control member 32, so that the feeler member 10, during its continued outward motion, turns clockwise about its pivot pin 17 against the stop 16 to a limit position, unless the feeler member 10 already occupies this limit position from its preceding operation.

Until the five feeler members 10 are thus adjusted, the feeler levers 27 and 28 remain in the active position determined by the position of the magnet armature. When the cam lobe 6a of cam 6 runs off any just-actuated control lever 9, this lever is biased back to its starting position by the spring 14, and the feeler member 10 moves accordingly toward the center. During this radially inward motion of feeler member 10, its sword tip 10a slides along the left side (Fig. 6) of the adjacent swing lever 20, thus turning the swing lever counterclockwise. The rotation of swing lever 20 is transmitted by pin 18 (Figs. 1, 6) to the reversing lever 12 which displaces the one pertaining selector disc 11 unless this disc already occupies the proper position.

The feeler devices operate analogously when the control member 32 occupies the other one of its two angular positions. In the latter case, the lug 10c of feeler member 10 abuts against the projection 32c of the control member 32 so that the feeler member 10 turns counterclockwise about its pivot pin 17 and causes its tip 10a to slide along the right-hand side of the knife edge on swing lever 20, thereby controlling the selector disc 11 to occupy the other angular position.

In the same manner, the other four elements of each code combination being received by the magnet assembly are translated into corresponding combinative adjustment of the five selector discs 11 and then remain stored in the selector disc assembly for the subsequent control of the printer.

As mentioned above, the release pin 24 (Figs. 1, 3, 8), when moved away from the gear box 2 by operation of the receiver magnet, releases a single start-stop cycle of revolution of cam shaft 5. How this comes about will now be explained with reference to Fig. 8.

The gear box 2 encloses a speed reducing train of spur gears 137, 138, 139, 140. Gear 140 is firmly joined with a shaft 60, while gear 141 is revolvable on the same shaft and is driven from gear 140 through a slip coupling comprising a coupling sleeve 143, a felt disc 144 and a spring 145. As long as no signal is being received, i.e., the receiving magnet is in its position of rest, the gear 141 is kept arrested by a spur gear 146 so that the slip coupling runs idle. Gear 146 is firmly connected with a hub member 147 and is rigidly mounted on the shaft 5 that carries the cam 6. Member 147 has an axial bore engaged by the release pin 24. A slot 147b in member 147 extends in a transverse plane from one side to the other of the axial bore. A releasing lever 148 is rotatably mounted in slot 147b for movement about a pivot bolt 149. The lower arm of lever 148 normally abuts against the release pin 24. Another arm 148b of lever 148 is held against a stop 150 by the torque transmitted from the slip coupling. The stop 150 is adjustable along the periphery of gear box 2 to permit displacing the feeler moments of the individual members 10 relative to the releasing moment.

When a starting pulse is being received, the release pin 24 is drawn out of member 147 by the armature of the receiving magnet. This releases the lever 148. Lever 148 commences to rotate about pivot bolt 149 due to the torque transmitted from the slip coupling. Lever 148 continues rotating until the end of its outer arm lies outside the range of stop 150. The spur gears 146 and 141 are now connected through the slip coupling with the drive motor and start performing one revolution. In the meantime, the lever 148 is pulled back by the spring 151 so that the release pin can return into its original position of rest. Then lever 148 is again blocked and its inner arm, upon completion of a single rotation, again arrests the gears 146 and 141 until a new releasing pulse is received.

Before continuing, it will be helpful to briefly review the operation of the receiver so far described.

Figure 8:
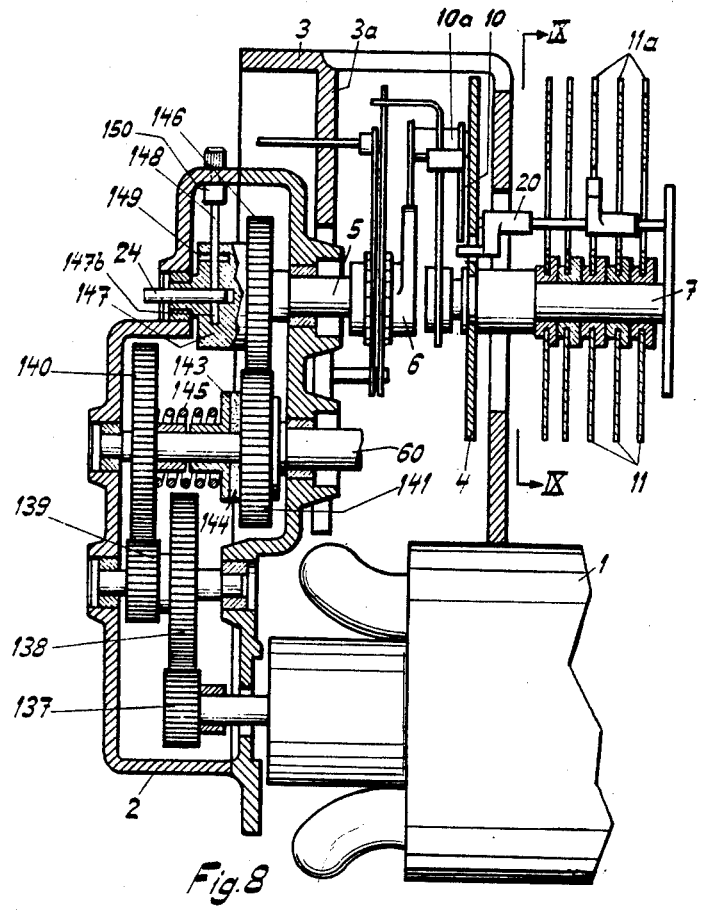
Fig. 8 is a vertical section through a gear box portion of the apparatus shown in Fig. 1.
Figure 9:
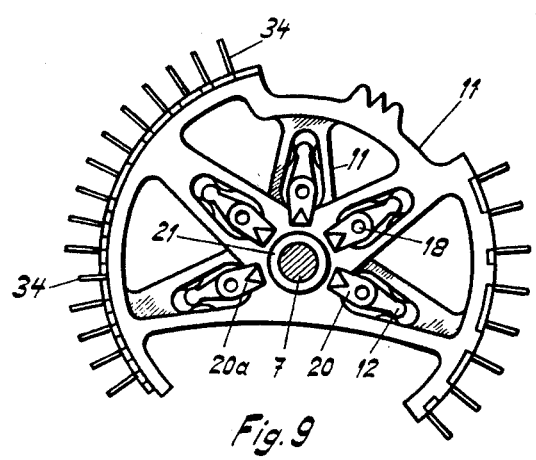
Fig. 9 is a front view of one of a group of selector discs that form part of the receiving portion of the apparatus.

When the teletypewriter is in receiving condition, the motor 1 is continuously running but the receiver cam shaft 5 and the printer control shaft 60 are both kept arrested by lever 148 abutting against the stop 150 (Fig. 8). When now a five-unit signal is being received by the receiver magnet, the starting signal, preceding the code combination proper, causes the magnet to withdraw the release pin 24 from stop lever 148 which then is released from stop 150 and permits the slip coupling to revolve the gears 141, 146 so that shaft 5 turns a single full revolution. During that revolution the five elements of the code combination are sequentially received and cause the five devices of the translating mechanism to control the angular setting of the five selector discs 11 in the above-described manner. Depending upon the particular combination of settings thus obtained, only a selected one of the selector levers 34 will drop into an aligned row of peripheral notches 11a of the selector discs 11, depending upon the message character represented by the code combination. Thereafter, this one selector lever 34 cooperates with the continuously revolving shaft 60 in controlling the operation of the printer in the manner still to be described, so that the printer produces an imprint of that message character.

Figure 11:
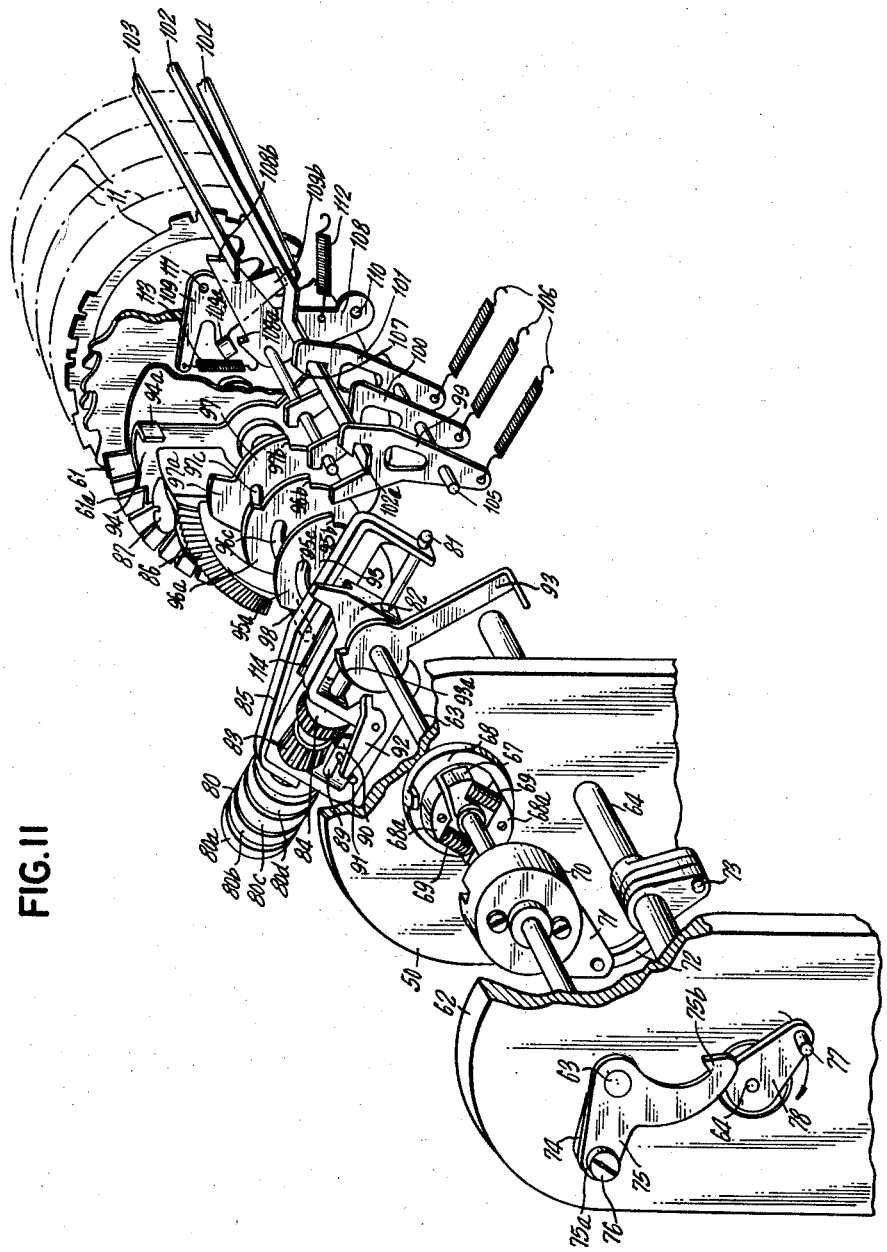
Fig. 11 is a schematically perspective view of the printing mechanism including the essential components needed for the control of the type carrier, all parts being shown in exploded fashion to make the design and operation more clearly apparent.
Figure 15:
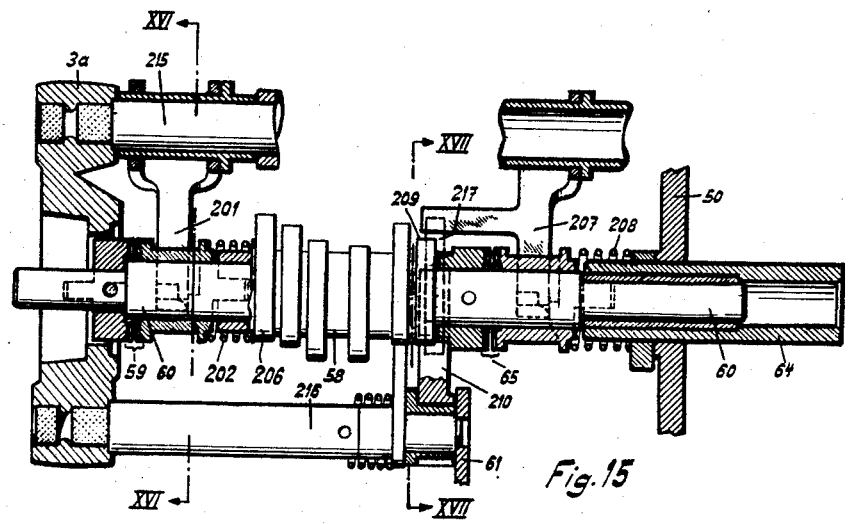
Fig. 15 is a partly sectional top view showing details of couplings and other driving elements.

When this operation is completed, it is, of course, necessary to have the receiver reset itself to the initial condition in which the just-mentioned selector lever 34 is moved back to its inactive position so that another printing operation can follow in response to a subsequent train of pulses. The means for effecting such a resetting are as follows:

Revolvably mounted on the end of the stationary spindle 7 is a lifting segment 57 with two rows of teeth for coaction with the selector levers 34 (Figs. 1, 11). The lifting segment 57 has the purpose to release the selector discs 11 after each operation for a new setting by lifting the selector lever 34 previously dropped into the row of registering notches of the discs 11 away from the discs. The lifting of the selector levers is effected by clockwise revolution of segment 57 (Fig. 11) by about one-half of its tooth division. After such revolution of segment 57 all other selector levers 34 are also lifted off the selector discs 11. The subsequent release of the selector levers 34 occurs only after all five selector discs 11 are again set to respective positions corresponding to the pulse combination next received. The lifting segment 57 is driven in the just-mentioned manner by a cam 206 (Fig. 15) mounted on a hollow intermediate shaft 58 which is revolvably seated on the drive shaft 60 and is coupled with shaft 60 by means of a claw-type clutch 59 (Figs. 1, 15).

Clutch 59 is controlled as follows. As long as cam shaft 5 is at rest, that is when no signal pulses are being received, a control lever 201 pivotally mounted on a pin 215 (Figs. 15, 16) holds the clutch 59 open in opposition to the force of a spring 202. The cam shaft 5 is provided with a cam 203 which, after termination of the translating and storing operation, acts temporarily, through an intermediate lever 204 pivoted on a pin 205, upon the control lever 201 for clutch 59, thus causing the clutch 59 to close for a single full revolution of the intermediate shaft 58. When this single revolution is completed, the clutch 59 again opens due to the action of the control lever 201, provided this lever is not again acted upon by the cam 203 of shaft 5. During the revolution of intermediate shaft 58, the lifting segment 57 is once turned back and forth by an amount equal to half of the spacing between its lifting teeth.

*The printer*

Figure 16:
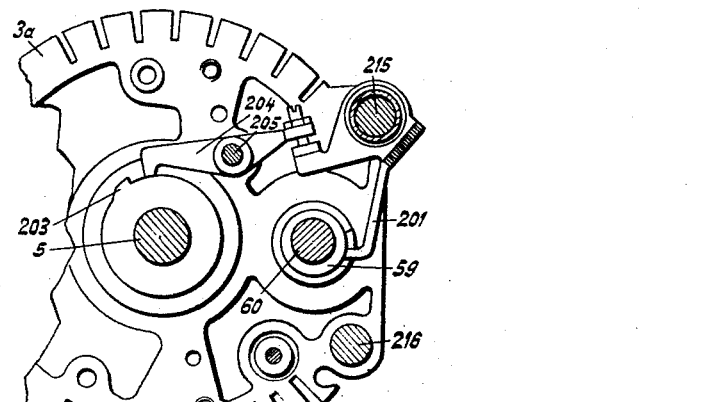
Fig. 16 shows a detail of a coupling in a section along the line XVI—XVI in Fig. 15.
Figure 17:
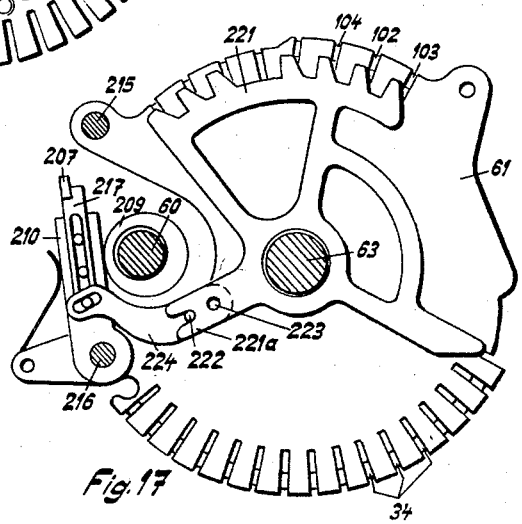
Fig. 17 shows another detail of coupling elements in a section taken along the line XVII—XVII in Fig. 15.

A supporting plate 62 and a bearing segment 61 are rigidly joined with the bearing plate 50 (Figs. 1, 11) by suitable connecting means (not illustrated). The bearing segment is mounted on the wall 3a (Figs. 15, 16) of the housing 3 (Fig. 1) by means of bolts 215 and 216 (Figs. 15, 16). Two shafts 63 and 64 are revolvably journalled in the two bearing plates 50 and 62. Shafts 63 and 64 extend in parallel relation to the axis of the platen roller and are interconnected by transmission means described below. Shaft 63 carries the type carrier 80 (Figs. 1, 11, 12, 14, 18) and, when revolving, swings the carrier about the axis of shaft 63 (Figs. 1, 11, 12). Shaft 64 is coaxially aligned with the drive shaft 60 which, as described, is coupled with the drive motor 1 and in continuous revolution as long as the teletypewriter is in operative condition. The type-carrier shaft 63 extends in coaxial relation to the stationary spindle 7 of the receiving mechanism (Fig. 1). The drive shaft 64 is connected by a claw-type clutch 65 (Figs. 1, 15, 17) with shaft 60.

The clutch 65 is similar to the above-described clutch 59. That is, clutch 65 is spring biased to close but is normally kept open by a control lever 207 in opposition to the force of a spring 208. This condition obtains as long as the intermediate shaft 58 is at rest. Immediately after the intermediate shaft 58 commences to revolve, a cam 209 mounted on shaft 58 acts upon the control lever of clutch 65 through a movable intermediate member 210 pivoted at 216. This permits clutch 65 to close. The intermediate member 210 has a displaceable tongue 217 (Figs. 15, 17) which extends the member 210 into the operating range of the control lever 207. Clutch 65 remains closed during a full revolution of shaft 60 and is thereafter reopened by the control lever 207 when the single-turn revolution of shaft 60 is completed. The intermediate member 210 is placed out of action, by movement of the tongue 217 out of the range of control lever 207, when one of a number of control selector levers, correlated to respective signal-responsive control commands ("Letters," "Numerals and Punctuation Marks," "Return Movement of Carriage" etc.) is actuated. These control levers, described below with reference to items 102, 103, 104, coact with the tongue 217 as follows: A segment 221 freely rotatable about shaft 63 is turned counter-clockwise (Fig. 17) when any one of the control levers is actuated. During the counter-clockwise movement a bifurcated portion 221a of segment 221 displaces a pin 222 fixed to a lever 224. Lever 224 has one end pivoted at 223 to bearing segment 61, while the other end is articulately joined with the tongue 217 out of the range of control lever 207 when the segment 221 is turned. This prevents the shaft 64 from being coupled with shaft 60 so that the type carried shaft 63 is likewise not placed in operation.

The drive shaft 64 imparts driving motion to the type carrier shaft 63 through two different transmission devices. One of these devices consists of a crank mechanism located between the bearing plates 50 and 62. During one revolution of drive shaft 64 the crank mechanism swings the type carrier 80 once back and forth. That is, the type carrier is first swung from the initial position shown on the drawings (Figs. 2, 11, 12) through an angle of about 60° up to a few angular degrees away from the platen roller 66 (first stage of carrier motion) and is thereafter swung back to the initial position when the printing operation is completed (third stage of motion). At the end of the first stage of motion the type carrier reaches an end position at which it stops temporarily. The printing operation proper is effected by means that are located toward the right of bearing plate 62 in Fig. 1 and impart to the type carrier an impact that flings it (second stage of motion) beyond the end position of the above-mentioned back and forth movement.

To this end, the type carrier shaft 63 carries a double-armed follower member 67 cooperating with a disc 68 that is loosely seated upon shaft 63 and has two driver dogs 68a. Drivers 68a act directly upon the follower 67 when disc 68 revolves in one direction but can act upon follower 67 only through intermediate coupling springs 69 when disc 68 revolves in the other direction.

A cap 70 is firmly seated on cam disc 68 and in claw engagement therewith. Cap 70 encloses the coupling springs 69 and the cooperating parts 68a and 67 (Figs. 1, 11). An arm 71 projecting from cap 70 is linked by a pitman 72 with a crank 73 on drive shaft 64. When shaft 64 is being driven, crank 73 transmits limited rotary motion to cap 70 and disc 68. This motion is transmitted to shaft 63 by the drivers 68a and the follower member 67; and the unilaterally effective coupling springs 69 then permit the type carrier shaft 63 to swing beyond the end position reached by the drivers 68a thus producing the above-mentioned second stage of type-carrier motion.

The second transmission device between shafts 63 and 64 comprises crank 74 firmly mounted on the end of the type-carrier shaft 63. A doubled-armed lever 75 of angular shape, loosely seated upon shaft 63 adjacent to crank 74, is separably linked with crank 74 by means of a screw 76 that passes through a slot in the arm 75a of lever 75. The other arm 75b of lever 75 cooperates with a dog pin 77 of a crank 78 firmly mounted on the end of shaft 64 to produce the following operation.

During the first stage of type-carrier motion, that is while the carrier is swinging from the initial position toward the platen roller, the drive shaft 64 and the type-carrier shaft 63 revolve both in the same sense. The position of the lever 75, which may be changed within certain limits relative to the crank 74, is so set relative to crank 78 that the dog pin 77 hits upon the end of lever arm 75b at the moment when the type carrier 80 reaches the end position of its first stage of motion. Then the dog pin 77 imparts to the lever arm 75b an impact that causes the type carrier 80 to swing from that end position against the platen roller.

The type carrier 80 has four rows of type faces located on respective rings 80a to 80d (Figs. 11, 14) of which two adjacent ones contain letters. The two other mutually adjacent rows contain numerals and punctuation marks or other characters hereinafter all referred to simply as "numerals." Distributed over the first row of type faces 80a are those letters that, in the five-unit code, commence with a "pause." The second row 80b comprises those letters that commence with a "current pulse." Analogously, the row 80c comprises the numerals that, in the five-unit code, commence with a "pause," while the remaining row 80d comprises the numerals commencing with a "pulse." The selection of a type row, therefore, is effected, on the one hand, in dependence upon the particular control command ("Letters" or "Numerals") being received and, on the other hand, in dependence upon whether the first unit of the code combination being received is a "pulse" or a "pause." The type carrier 80 has sixteen selective positions distributed over its periphery. How the selection of any one angular position of the type carrier and the shifting from one to an adjacent type row are effected will be further explained in a later place. Of course, the rings 80a to 80d may also be arranged in a sequence different from the one described, for instance, by replacing the rings for characters beginning with a "pause" for the rings whose characters begin with a "pause."

Figure 14:
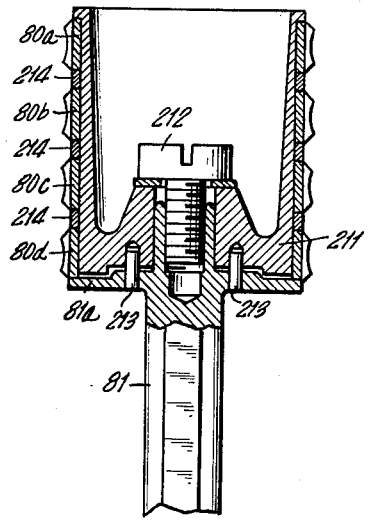
Fig. 14 is an axial sectional view of the type carrier.

The type carrier 80 is mounted on the end of a spindle 81 extending at a right angle to the type-carrier shaft 63 (Figs. 11, 12, 14). The spindle 81 has a flange 81a to which a hollow cylinder 211 is fixed by means of a screw 212. Pins 213 prevent the cylinder 211 from revolving relative to the spindle. The type-face rings 80a to 80d for letters and numerals are spaced from each other by intermediate rings 214 and are forced against a shoulder 211a of cylinder 211 by means of the flange 81a. Rings 80a to 80d are made of a harder material than the spacer rings 214 and have their narrow axial sides serrated and in engagement with mating serrations of the spacer rings 214. As a result the rings, when pressed together, are safely locked in position relative to each other so that, when the type carrier is assembled and properly adjusted, a mutual displacement of rings 80a to 80d is no longer possible. This design of the type carrier has the advantage that the letter and numeral rings can conveniently be adjusted and can be exchanged if desired. Mounted on carrier shaft 63 is a holding bracket 82 in which the spindle 81 is revolvably and longitudinally displaceable. A pinion 83 and a ratchet 84 (Fig. 11) are mounted on spindle 81 in such a manner that the spindle can not revolve but can perform axial displacements relative to pinion 83 and ratchet 84, both of which are prevented by holding bracket 82 from moving axially. For placing the type carrier 80 into a higher position, a lifting bracket 85 is mounted on the carrier spindle 81. Bracket 85 enters into peripheral grooves (not visible) machined into the spindle 81 so that any axial displacement of bracket 85 is imparted to the spindle and to the type carrier.

Figure 13:
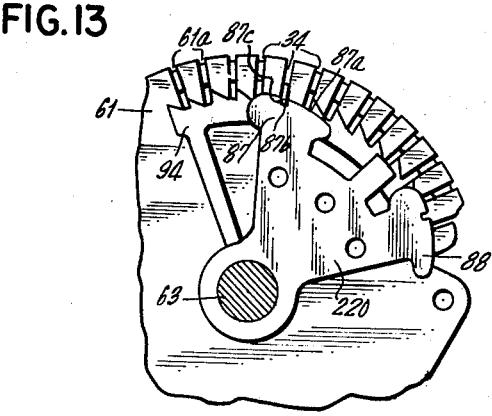
Fig. 13 shows a detail of Fig. 12 in a sectional view taken along the line XIII—XIII in Fig. 1.

Pinion 83 is continuously in meshing engagement with a spur gear segment 86 (Figs. 11, 12) loosely seated upon the type carrier shaft 63. Due to slight friction between pinion 83 and holding bracket 82, the gear segment 86 is at first entrained when the type carrier 80 is swung away from its initial position. Connected with the gear segment 86 is a segment member 220 that carries two pawls 87 and 88 (Fig. 13). Pawl 87 has a lifting cam 87a, a slot 87b and a stop 87c. During rotary movement of gear segment 86, the pawl 87 moves along the selector levers 84 (Fig. 12) whose ends pass through slots 61a (Figs. 11, 13) of the bearing segment 61. The pawl 88 is designed and operative in the same manner as the pawl 87. The arrangement is such that each selector lever 34 enters into the operating range of one of the respective pawls 87 and 88 when the selector lever drops into the aligned notches 11a of the five selector discs 11 under control by the received pulse combination as explained in the foregoing description of the receiver. For instance, when pawl 87, during its movement, engages the one selector lever 34 then dropped in, this selector lever is lifted by the cam portion 87a of pawl 87. As soon as the stop 87c of pawl 87 abuts against the selector lever, the lever drops into the slot 87b and thus latches the pawl 87 and therewith the gear segment 86 in the position then reached by these parts.

During the swinging movement of the type carrier 80 from its initial position, the gear segment 86 is at first entrained without causing a rotary movement of the type carrier. However, when the gear segment 86 is arrested by the stop 87c of the pawl 87 abutting against a dropped-in selector lever 34, the continuing swinging movement of the type carrier causes the pinion 83 to roll along the gear segment 86. This turns the type carrier 80 a given angle until the end of the first partial movement is reached. This angle depends upon the position of the dropped-in selector lever relative to the range of movement of the stop 87c. If all fifteen selector levers 34 required for storing the code-pulse combinations are distributed over this swinging range of about 60°, each individual character of a type row can be placed into printing position in front of the platen roller up to the end of the first partial movement. In the illustrated example, however, the selector levers 34 are distributed over one-third of the entire periphery for better utilization of space. For that reason, the pawl 87 is duplicated by a pawl 88 (Fig. 12) which is displaced about 60° relative to pawl 87 and performs the same functions as the pawl 87, each of the two pawls being assigned to a different group of the selector levers. This particular arrangement of the selector levers 34 over one-third of the total periphery also determines the arrangement required for the characters within each type row. Accordingly, the characters that correspond to the selector levers 34 to be scanned by each individual pawl are alternately arranged between those characters that correspond to the selector levers to be scanned by the other pawl.

After termination of the first stage of motion of the type carrier 80, the selected character to be printed is located in front of the platen roller 66. In this position, the type carrier 80 is latched and is then ready for printing the character, the latching operation being facilitated by the fact that the type carrier is momentarily at rest. The means for latching the type character are apparent from Fig. 11. A detent 90 cooperates with the ratchet 84. Detent 90 is rotatable about an axle 89 and is urged by a spring (not visible) into engagement with the ratchet 84. In the illustrated position, however, the detent 90 is kept out of engagement with ratchet 84 by means of a pin 91 which is firmly secured to the axle 89 and acted upon by a lever 92. The position of lever 92 is controlled by a cam portion 93a of lever 93 loosely mounted on the type-carrier shaft 63. The end of lever 93 is so mounted that the angular position of lever 93 can be adjusted within certain limits.

At the end of the first stage of motion of the type carrier 80, the lever 92 slides off the cam 93a and turns clockwise about its pivot axis. This releases the detent 90 for spring-biased engagement with ratchet 84. During the swinging back motion of the type carrier 80, detent 90 is again withdrawn from ratchet 84 by lever 92 again running onto the cam 93a. The type carrier 80 turns back into its initial position since the gear segment 86 can not rotate back farther than to a fixed starting position determined by a stationary stop (not shown).

Adjacent to the bearing segment 61 there is a throw-out segment 94 loosely seated on the type-carrier shaft 63. Segment 94 is turned about shaft 63 immediately prior to the latching of the type carrier 80 and then lifts the dropped-in selector lever 34 out of the range of the pawl 87 or 88 so that the impact occurring during the printing operation cannot act upon that selector lever. The rotary movement of the throw-out segment 94 is effected under control by the swinging movement of the type carrier 80. To this end, a stop (not shown) mounted on the holding bracket 82 of the type carrier abuts against a lateral lug 94a of the throw-out segment 94 shortly before termination of the first partial carrier motion, thus entraining the throw-out segment. The lifting movement of the type carrier 80 for shifting between the type rows 80a to 80d also takes place during the first stage of motion of the type carrier and is also controlled by the swinging movement imparted to the type carrier by the shaft 63. For each step of lifting movement of the type carrier a different cam disc 95, 96 or 97 with cam lobes 95a, 96a, 97a of different respective heights is provided. The cam discs 95, 96, 97 are revolvably seated upon the type carrier shaft 63. The cam lobes 95a, 96a, 97a act upon a guide pin 98 firmly attached to the lifting bracket 85 so that the cam lobes can lift the bracket 85 and the carrier 80 during the swinging movement of the carrier as will more fully appear from the following. The cam discs 95, 96, 97 are selectively latched by respective latching levers 99, 100, 101 under control by three control levers 102, 103, 104 selectively actuated by a selecting device in response to the signal pulses being received.

The latching levers 99, 100, 101 are freely rotatable on a common shaft 105 and are biased by respective springs 106 toward respective noses 95b, 96b, 97b of cam discs 95, 96, 97. The two latching levers 100 and 101 may abut against a stop pin 107 which, in the illustrated operating position, keeps these two latching levers out of engagement with the respective cam discs 96 and 97. The stop pin 107 is secured to a lever 108 pivoted at 110 about a stationary pivot point. The lever 108 cooperates with a latch pawl 109 pivoted at 111 and has a nose 108a to cooperate with a lug 109a of the latch pawl 109. Lever 108 and latch pawl 109 are biased by respective springs 112, 113 and have respective extensions 108b, 109b engageable with the respective control levers 103 and 104. The latching levers 101 and 99 are retained in the illustrated, inactive position by an extension 102a of the selective control lever 102 as long as lever 102 remains inactive.

With the exception of the special features of the control levers 102, 103, 104 described below, these levers are designed, pivoted and selectively controlled in substantially the same manner as the above-described selector levers 34 of the receiver. Just like the selector levers 34, the control levers 103 and 104 will selectively drop into marginal notches of all five selector discs 11 if the notches in the respective discs 11 are all aligned, except that this occurs only in response to the reception of special pulse combinations that denote the control commands "Numerals" and "Letters" respectively. The control lever 102, as regards its selective operation, differs from levers 34, 103 and 104 in that it cooperates with only one of the five selector discs 11, namely the one that receives the first code element of the pulse combination. When the first element of the code combination is a "pulse" lever 102 can drop into a marginal slot of that selector disc; but when the first element of the pulse combination is a "pause" the control lever 102 remains arrested by the selector disc.

The operation of the described type-row shifting mechanisms is as follows:

As explained, the reception of the pulse combination "Letters" causes the control lever 104 to drop in. Lever 104 then presses against the extension 109b and turns the latch pawl 109 clockwise. Lug 109a of pawl 109 moves away from nose 108a of lever 108. Lever 108, thus released, causes the stop pin 107 to retain the two latching levers 100 and 101 under the force of spring 112. Fig. 11 shows the just-mentioned parts in the positions occupied after reception of the pulse combination "Letters." When, thereafter, the lifting segment 57 moves the control lever 104 away from the selector discs 11, the lever 108 and the pawl 109, as well as the latching levers 100 and 101, remain in the position previously occupied. During the subsequent reception of pulse combinations whose first unit is a "pause," the control lever 102, as explained, can not drop in so that the latching lever 99 is also prevented from moving toward the corresponding cam disc. All three cam discs 95, 96, 97 therefore do not abut against any obstacle and, entrained by pin 98, revolve freely during the subsequent swinging movement of the type carrier 80. Consequently, a lifting movement of the type carrier 80 does not occur, and the first type row 80a is placed into printing position.

However, if the first unit of the code combination being received is a "pulse," the latching lever 99 is released for operation due to the fact that the control lever 102 will now drop in. Latching lever 99, under the biasing force of the appertaining spring 106, engages the nose 95b of cam disc 95. Cam disc 95 is now latched in position and, during the subsequent swing movement of the type carrier, forces the guide pin 98 to run upwardly along the cam 95a. This causes the lifting bracket 85 to raise the type carrier 80 one step so that the second type row 80b reaches the printing position.

The reception of the pulse combination "Numerals" causes the selecting device to actuate the control selection lever 103 as described in the foregoing. Lever 103, when dropping in, presses against the extension 108b and turns the lever 108 counterclockwise so that the stop pin 107 releases the latching levers 100 and 101. The lug 109a of pawl 109, biased by the spring 113, drops into engagement with nose 108a of lever 108 and thus latches lever 108 in the position then occupied. Latching lever 100 engages nose 96b and latches cam disc 96, while latching lever 101 is at first still retained by the control lever 102.

During the subsequent reception of code pulse combinations whose first unit is a "pause," the control lever 102 abuts against the periphery of the corresponding selector disc 11, thus retaining the latching lever 101 in the inactive position. Since now the cam disc 96 with the corresponding higher cam 96a is latched, the type carrier 80, during its swinging movement, is lifted to the extent needed to place the third type row 80c into printing position. Fig. 12 shows the type carrier 80 in this position as it hits against the platen roller to produce an imprint upon a sheet (not shown) passing around the roller.

When receiving pulse combinations whose first code unit is a "pulse," the control lever 102 drops in and releases the latching lever 101 which then latches the cam disc 97 with the highest cam 97a. As a result, the type carrier 80, during its swinging movement, is lifted into the uppermost position to place the fourth type row 80d into the printing position.

The lobes of the cam discs 95, 96 and 97 have such a peripheral length that the lifting bracket 85 remains in the lifted position during the residual swinging movement of the type carrier including the printing operation proper (second stage of carrier motion) thus obviating the necessity of separate means for latching the lifting bracket. When the type carrier 80 swings back toward its initial position, a spring 114 (Fig. 11) attached to the holding bracket 82 pulls the lifting bracket 85 back, thus returning the type carrier 80 also to the initial position of its lifting movement. The cam discs 95, 96 and 97 are likewise returned to the initial position. This is effected by means of a returning pin (not illustrated) which is attached to the lifting bracket 85 and passes through respective slots 95c, 96c, 97c of the respective cam discs.

As mentioned above, the setting of the selector discs 11 in response to the pulse combinations being received and subsequently the releasing of the printing mechanisms take place during one full revolution of the receiver cam shaft (Figs. 1, 8). The movement of the type carrier 80 commences only after the receiver cam shaft 5 has completed this start-stop revolution. Although the setting of the selector disc 11 must be maintained during the first stage of motion of the type carrier because the selector levers 34 are being scanned during that movement, the described design of the receiver mechanism makes it possible to continue receiving an uninterrupted sequence of pulse combinations. If the completed translating and storing of a pulse combination is immediately followed by the reception of another pulse combination, the new setting of the selector disc 11 occurs only at a moment when the reception of all five elements of the pulse combination is completed, because the lifting segment 57 is actuated only at that moment and then resets the selector lever 34 previously dropped in to store the preceding pulse combination. At that moment, however, the first stage of type-carrier motion is completed. During the reception of the pulse combination, after the cam lobe 6a has run off the control levers 9 of the receiving mechanism, the sword members 10 can move only up to those swing arms 20 that have remained undisplaced. The resetting of the previously dropped-in selector lever 34 then has the consequence that all selector discs 11 are adjusted together by simultaneous action of all previously adjusted swords 10 upon the respective swing arms 20.

Figure 19:
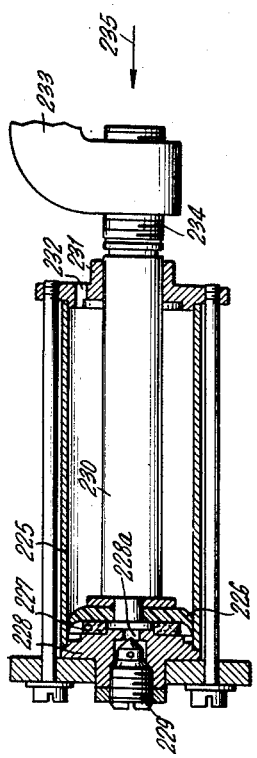
Figs. 19 and 20 are sectional views of an air brake for stopping the printer carriage at the end of its return travel, showing the device in the final position and in the initial position respectively.
Figure 20:
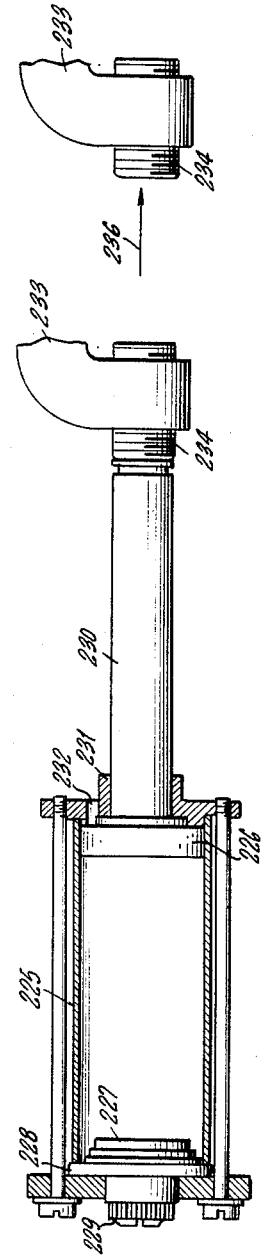

For buffering the printer carriage at the end of its return run, the teletypewriter is equipped with an airbrake dash-pot whose cylinder 225 is mounted on the machine frame 200 (Fig. 18). The piston 226 (Figs. 19, 20) of the device may consist of plastic material. The bottom of cylinder 225 is formed by a flange 228 which carries a washer 227 of leather or the like to form a stop for limiting the movement of the piston. The end flange 228 is provided with a regulatable valve formed by a pointed screw 229 with longitudinal and transverse bores coacting with a bore 228a in the flange 228. The piston 226 is mounted on a rod 230 of magnetizable material which is longitudinally displaceable in a sleeve formed by the other end flange 231 of the cylinder 225. Flange 231 has a hole 232 through which the air space behind the piston communicates with the ambient air. The printer carriage has an arm 233 on which a buffer 234 of magnetic material is mounted in coaxial relation to the piston rod 230. During the return run of the printer carriage, the buffer 234 abuts in the direction of the arrow 235 against the piston rod 230 and moves the piston to the end position shown in Fig. 19 while forcing the air out of cylinder 225 through the regulating valve. During the forward run of the printer carriage in the printing direction indicated by the arrow 236, the magnetic buffer 234 pulls the piston rod 230 with piston 226 stepwise up to the final position shown in Fig. 20 and thereafter removes itself from the end of the piston rod 230.

In view of the high operating velocity of the printer, it is preferable to keep the mass of the movable parts, particularly that of the type carrier, as small as possible. It has been found especially favorable to make the type carrier completely of plastic material such as nylon, for instance by injection molding.

Figure 2:
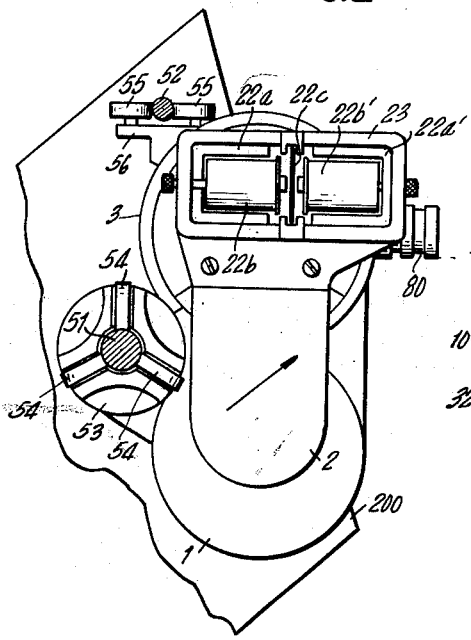
Fig. 2 shows the apparatus by a partly sectional view taken from the left of Fig. 1; for convenient illustration, the apparatus is shown in a tilted position, the normally vertical direction being indicated in Fig. 2 by the head of an arrow.

The illustrated and above-described receiver-printer assembly has various advantages in comparison with the corresponding devices of known teletypewriters. Figs. 1 and 2 particularly exhibit the compact design made possible by the comparatively slight expenditure in material and the simple construction of the driving means for the printer. The receiver-printer apparatus according to the invention is further distinguished by the fact that the impact movement imparted to the type carrier is the same for all characters to be printed, thus resulting in an improved uniformity of the impressions produced. By virtue of the fact that the swinging movement of the type carrier is composed of partial motions that are produced by respectively different force-transmitting devices, only a few structural parts are exposed to the impact forces occurring during printing. After each printing operation the type carrier is moved away from the platen roller to such an extent that the printed text is always readily visible. Furthermore, all devices customarily employed for the other control operations, such as for the advance and return of the receiver-printer carriage, or for the paper feed to obtain the desired line spacing, can readily be mounted on the receiver-printer assembly and can be driven from the single motor of that assembly without appreciably increasing the over-all space requirements of the assembly.

It should be understood that the invention, as set forth with particularity in the claims annexed hereto, is not limited to the preferred embodiment here chosen for illustration and description. It will be obvious to those skilled in the art, upon a study of this disclosure, that apparatus according to my invention permit of various modifications, for instance, with respect to the particular drive means used for operating the printer. It should especially be understood that a teletyping mechanism, according to my invention, is not limited for use with the particular receiving and translating mechanism described in conjunction with the illustrated assembly. As far as the receiver is concerned, it is only necessary that it be equipped with selector levers or similarly operating pulse-storing (memorizing) structures suitable to be scanned by means of stops that travel with the type carrier during the swinging motion of the latter and are thus available for controlling the setting of the type carrier.

I claim:

1. In a teletypewriter having a platen roller rotatably mounted at a fixed location, a carriage movable along said platen roller, code-pulse receiving means mounted on said carriage, and a printer mounted on said carriage and selectively controllable by said receiving means; said printer having a type carrier with a plurality of annular and coaxial rows of type faces, said carrier being revolvable about, and axially displaceable along, the axis of said annular rows relative to said carriage for placing a selected one of said type faces into printing position and said carrier being angularly movable relative to said carriage from an initial position toward said platen roller in a radial plane of said platen roller to produce an imprint of said selected type face; a start-stop drive forming part of said carriage assembly and having a unidirectionally revolvable drive shaft and a carrier shaft both parallel to said platen roller, holding means securing said carrier to said carrier shaft with said axis extending at a right angle to said carrier shaft, a reciprocating transmission connecting said carrier shaft with said drive shaft so that said carrier shaft reciprocates once for each full revolution of said drive shaft, whereby said carrier performs said swinging motion to produce said imprint and returns to said initial position during each full revolution of said drive shaft.

2. In a teletypewriter having a platen roller rotatably mounted at a fixed location, a carriage movable along said platen roller, code-pulse receiving means mounted on said carriage and a printer mounted on said carriage and selectively controllable by said receiving means; said printer having a type carrier with annular and coaxial rows of type faces, said carrier being revolvable about, and axially displaceable along, the axis of said annular rows relative to said carriage for placing a selected one of said type faces into printing position and said carrier being capable of swinging motion from an initial position toward said platen roller in a radial plane of said platen roller to produce an imprint of said selected type face; a start-stop drive forming part of said carriage assembly and having a unidirectionally revolvable drive shaft and a carrier shaft both parallel to said platen roller, means securing said carrier to said carrier shaft, a crank transmission connecting said drive shaft with said carrier shaft for imparting said swinging motion to said carrier, said crank transmission having a dead-center position when said carrier has swung from said initial position to a point close to but still spaced from said platen roller, a unilateral spring coupling interposed between said transmission and said carrier shaft to permit further motion of said carrier beyond said point and against said platen roller, and impact means controlled by said drive shaft and active upon said carrier substantially at the moment of said dead-center position to impart said further motion to said carrier.

3. In a teletypewriter having a platen roller, and a carriage assembly movable along said platen roller and comprising code-pulse receiving means and a printer selectively controllable by said receiving means; said printer having a type carrier movable from an initial position toward said platen roller in a radial plane of said roller for producing an imprint, a start-stop drive forming part of said carriage assembly and comprising a carrier shaft on which said carrier is mounted and a unidirectionally revolvable drive shaft, both shafts being parallel to said platen roller, a driver member revolvably seated on said carrier shaft, a crank firmly connected with said drive shaft and linked to said driver member to impart swinging motion to said driver member, a follower member firmly secured to said carrier shaft, and coupling spring means urging said follower member unidirectionally toward abutment against said driver member, said driver member being in abutting engagement with said follower member to entrain said follower member when said carrier moves from said initial position until said crank reaches a dead-center position while permitting said follower member to continue swinging against the force of said spring until said carrier hits against said platen roller, and impact means controlled by said drive shaft and active upon said carrier substantially at the moment of said dead-center position to impart said continued swinging motion to said carrier.

4. In a teletypewriter having a platen roller, and a carriage assembly movable along said platen roller and comprising code-pulse receiving means and a printer selectively controllable by said receiving means; said printer having a type carrier movable from an initial position toward said platen roller in a radial plane of said roller for producing an imprint, a start-stop drive forming part of said carriage assembly and comprising a carrier shaft on which said carrier is mounted and a unidirectionally revolvable drive shaft, both shafts being parallel to said platen roller, a crank mechanism interconnecting said two shafts to impart a cycle of swinging motion to said carrier shaft for each full revolution of said drive shaft, said mechanism having a dead-center position when said carrier, swinging from said initial position, reaches a point close to but still spaced from said platen roller, spring means interposed between said crank mechanism and said carrier shaft to permit said carrier shaft to swing said carrier beyond said point, said two shafts having the same sense of revolving motion before said carrier reaches said point, two arms mounted on said respective shafts, said arm on said drive shaft being abuttable against said arm on said carrier shaft at the moment when said carrier reaches said point to impart to said carrier an impact for flinging it against said platen roller.

5. In a teletypewriter having a platen roller, and a carriage assembly movable along said platen roller and comprising a receiver and a printer; said receiver having signal-responsive selector structures selectively movable into a given path at spaced points respectively of said path, a carrier shaft parallel to said platen roller, a type carrier mounted on said shaft and having an axis perpendicular to said shaft; said type carrier having type faces distributed concentrically about said axis and being revolvable about said axis for selectively placing said type faces opposite said platen roller, reciprocating drive means connected with said carrier shaft for imparting to said carrier a swinging motion from an initial position toward said platen roller to produce an imprint and back to said initial position, a pinion coaxially joined with said carrier, a gear segment loosely seated on said carrier shaft and in meshing engagement with said pinion, said segment having a part located in said path and abuttable against one of said selector structures then moved into said path, whereby said gear segment during said swinging motion and prior to said carrier reaching said platen roller is entrained by said carrier and revolves about said shaft until said part abuts against said selector structure and arrests said segment for causing it to revolve said pinion and carrier an angle dependent upon the location of said selector structure.

6. In a teletypewriter having a platen roller, and a carriage assembly movable along said platen roller and comprising a receiver and a printer; said receiver having signal-responsive selector structures selectively movable into a given path at spaced points respectively of said path, a revolvable carrier shaft parallel to said platen roller, and a type carrier mounted on said shaft and having an axis perpendicular to said shaft; said type carrier having type faces distributed parallel to said axis and being displaceable along said axis for selectively placing said type faces into printing relation to said platen roller, spring means normally holding said carrier in a given position, lifting means connected with said carrier for displacing it from said given position, said lifting means being movable together with said carrier during said swinging motions, reciprocating drive means connected with said carrier shaft for imparting revolving movement to said carrier shaft to swing said carrier from an initial position toward said platen roller to produce an imprint and back to said initial position, a number of cam discs loosely seated upon said carrier shaft and having respective cam lobes of respectively different radial height engaging said lifting means, and latching means selectively actuable by said selector structures and engageable by said respective cam discs for arresting said cam discs depending upon which of said selector structures has moved into said path; whereby the arrested cam disc, prior to said carrier reaching said platen roller, causes said lifting means to be actuated by said cam lobe to axially displace said carrier an amount corresponding to the height of said lobe.

7. In a teletypewriter having a platen roller, and a carriage assembly movable along said platen roller and comprising a receiver and a printer; said receiver having signal-responsive selector structures selectively movable into a given path at spaced points respectively of said path; said printer having a type carrier with coaxial rows of type faces and being movable toward said platen roller in a radial plane of said platen roller for producing an imprint, and said type carrier being revolvable about and displaceable along the axis of said type rows for placing a selected one of said type faces into printing position; start-stop drive means forming part of said assembly and being connected with said type carrier to impart thereto three consecutive stages of swinging motion in said plane, said type carrier having in the first stage of motation a travel from an initial position through a large angle up to a travel end point of small angular spacing from said platen roller and having in the second stage of motation an accelerated travel against said platen roller and back to said end point and having in the third stage of motion a return travel back to said initial position; said start-stop drive means comprising a unidirectionally revolvable drive shaft and a carrier shaft both parallel to said platen roller, means securing said carrier to said carrier shaft, said two shafts having respective cranks of which the one of said carrier shaft has a longer crank radius than the other, a pitman interlinking said cranks whereby each full revolution of said drive shaft causes said carrier shaft to impart to said carrier said first and said third stages of motion, and impact means controlled by said drive shaft for imparting said second stage of motion of said carrier; revolving means and displacing means connected with said type carrier and having respective abutment members movable along said path and entrainable by said drive means during said swinging motion of said type carrier, said members being abuttable against said respective selector structures at respective locations within said type-carrier travel of said first stage of motion and being arrested by said abutment members at said locations when said structures are moved into said path, whereby said revolving means and displacing means are effective during said first stage of motion to revolve and axially displace said type carrier to set a selected one of said type faces into printing position.

8. In a teletypewriter having a platen roller, and a carriage assembly movable along said platen roller and comprising a receiver and a printer; said receiver having signal-responsive selector structures selectively movable into a given path at spaced points respectively of said path; said printer having a type carrier with coaxial rows of type faces and being movable toward said platen roller in a radial plane of said platen roller for producing an imprint, and said type carrier being revolvable about and displaceable along the axis of said type rows for placing a selected one of said type faces into printing position; start-stop drive means forming part of said assembly and being connected with said type carrier to impart thereto three consecutive stages of swinging motion in said plane, said type carrier having in the first stage of motion a travel from an initial position through a large angle up to a travel and point of small angular spacing from said platen roller and having in the second stage of motion an accelerated travel against said platen roller and back to said end point and having in the third stage of motion a return travel back to said initial position; said start-stop drive means comprising a unidirectionally revolvable drive shaft and a carrier shaft both parallel to said platen roller, means securing said carrier to said carrier shaft, said two shafts having respective cranks of which the one of said carrier shaft has a longer crank radius than the other, a pitman interlinking said cranks whereby each full revolution of said drive shaft causes said carrier shaft to impart to said carrier said first and said third stages of motion, said drive-shaft crank having a dead-center position when said carrier is at said travel end point of said first stage of motion, elastic coupling means interposed between said carrier and said carrier-shaft crank to permit said carrier to move beyond said end point, and impact means controlled by said drive shaft and active upon said carrier substantially at the moment of said dead-center position to impart said second stage of motion to said carrier; revolving means and displacing means connected with said type carrier and having respective abutment members movable along said path and entrainable by said drive means during said swinging motion of said type carrier, said members being abuttable against said respective selector structures at respective locations within said type-carrier travel of said first stage of motion and being arrested by said abutment members at said locations when said structures are moved into said path, whereby said revolving means and displacing means are effective during said first stage of motion to revolve and aixally displace said type carrier to set a selected one of said type faces into printing position.

References Cited in the file of this patent

UNITED STATES PATENTS

| | | |
|---|---|---|
| 457,298 | Blickenderfer | Aug. 4, 1891 |
| 583,840 | Blickenderfer | June 1, 1897 |
| 631,833 | Theadgold | Aug. 29, 1899 |
| 1,405,722 | Siepmann et al. | Feb. 7, 1922 |
| 1,738,777 | Krum | Dec. 10, 1929 |
| 2,059,537 | Salzberger et al. | Nov. 3, 1936 |
| 2,146,380 | Reiber | Feb. 7, 1939 |
| 2,245,615 | Slough et al. | June 17, 1941 |